United States Patent
Kim et al.

(10) Patent No.: US 9,802,396 B2
(45) Date of Patent: Oct. 31, 2017

(54) SYNTHESIS OF QUANTUM DOT/POLYMER/LAYERED-STRUCTURE CERAMIC COMPOSITE

(71) Applicant: POSTECH ACADEMY-INDUSTRY FOUNDATION, Pohang-si (KR)

(72) Inventors: Sungjee Kim, Pohang-si (KR); Seung Ho Cho, Pohang-si (KR); Jung Heon Kwag, Gimhae-si (KR); Sanghwa Jeong, Youngin-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 157 days.

(21) Appl. No.: 14/441,170

(22) PCT Filed: Oct. 28, 2013

(86) PCT No.: PCT/KR2013/009632
§ 371 (c)(1),
(2) Date: May 6, 2015

(87) PCT Pub. No.: WO2014/073814
PCT Pub. Date: May 15, 2014

(65) Prior Publication Data
US 2015/0298432 A1    Oct. 22, 2015

(30) Foreign Application Priority Data

Nov. 7, 2012 (KR) .................. 10-2012-0125554
Feb. 5, 2013 (KR) .................. 10-2013-0012666

(51) Int. Cl.
*B82Y 20/00* (2011.01)
*B82Y 30/00* (2011.01)
(Continued)

(52) U.S. Cl.
CPC .............. *B32B 27/30* (2013.01); *B32B 9/005* (2013.01); *B32B 9/04* (2013.01); *C01B 19/007* (2013.01);
(Continued)

(58) Field of Classification Search
USPC ........................................................ 524/445
See application file for complete search history.

(56) References Cited

U.S. PATENT DOCUMENTS 5,578,672 A * 11/1996 Beall .................. C01B 33/44
428/331
2011/0260111 A1 10/2011 Nie et al.

FOREIGN PATENT DOCUMENTS

BE   WO 2012025564 A1 *  3/2012 .............. B09B 1/004
JP   2009-185340 A    8/2009
(Continued)

OTHER PUBLICATIONS

Kameyama et al., Stacked-structure-dependent Photoelectrical Properties of CdS Nanoparticle/Layered Double Hydroxide (LDH) Nanosheet Multilayer Films Prepared by Layer-by-Layer Accumulation, Physical Chemistry Chemical Physics, 2009, vol. 11, pp. 5369-5376, Apr. 2009.*

(Continued)

*Primary Examiner* — Ramsey Zacharia
(74) *Attorney, Agent, or Firm* — Steptoe & Johnson LLP (57) ABSTRACT

The present invention relates to a quantum dot and a preparation method therefor, and more specifically, to a novel quantum dot composite having high surface stability, and a preparation method therefor. The quantum dot composite according to the present invention constitutes a layered-structure ceramic composite in which the layered-structure ceramic comprises a polymer-quantum dot composite between the layers thereof.

15 Claims, 12 Drawing Sheets

(51) Int. Cl.
  *B82Y 40/00* (2011.01)
  *C08K 9/04* (2006.01)
  *C08K 9/08* (2006.01)
  *C08K 9/10* (2006.01)
  *C09C 3/08* (2006.01)
  *C09C 3/10* (2006.01)
  *B32B 27/30* (2006.01)
  *C04B 35/628* (2006.01)
  *B32B 9/00* (2006.01)
  *B32B 9/04* (2006.01)
  *C01B 19/00* (2006.01)
  *C01F 7/00* (2006.01)
  *C09C 1/00* (2006.01)

(52) U.S. Cl.
  CPC .............. *C01F 7/002* (2013.01); *C01F 7/004* (2013.01); *C04B 35/62828* (2013.01); *C04B 35/62886* (2013.01); *C04B 35/62894* (2013.01); *B32B 2307/202* (2013.01); *B32B 2307/422* (2013.01); *B32B 2315/02* (2013.01); *B32B 2457/20* (2013.01); *B32B 2551/00* (2013.01); *B82Y 20/00* (2013.01); *B82Y 30/00* (2013.01); *B82Y 40/00* (2013.01); *C01P 2002/08* (2013.01); *C01P 2002/22* (2013.01); *C01P 2002/72* (2013.01); *C01P 2002/84* (2013.01); *C01P 2004/02* (2013.01); *C01P 2004/51* (2013.01); *C01P 2004/64* (2013.01); *C01P 2006/22* (2013.01); *C04B 2235/446* (2013.01); *C08K 9/04* (2013.01); *C08K 9/08* (2013.01); *C08K 9/10* (2013.01); *C09C 1/0081* (2013.01); *C09C 3/08* (2013.01); *C09C 3/10* (2013.01)

(56) References Cited

FOREIGN PATENT DOCUMENTS

| JP | 2010-235437 A | 10/2010 |
| KR | 10-2008-0086470 A | 9/2008 |
| KR | 10-2008-0107309 A | 12/2008 |
| WO | 2007065860 A1 | 6/2007 |

OTHER PUBLICATIONS

B. R. Venugopal et al., Layered Double Hydroxide-CdSe Quantum Dot Composites through Colloidal Processing: Effect of Host Matrix-Nanoparticle Interaction on Optical Behavior, J. Phys. Chem. B., 2006, vol. 110, pp. 772-776. See the entire document.
International Search Report of PCT/KR2013/009632, dated Mar. 4, 2014 (Mar. 4, 2014).

* cited by examiner

SYNTHESIS OF QUANTUM DOT/POLYMER/LAYERED-STRUCTURE CERAMIC COMPOSITE

CLAIM FOR PRIORITY

This application claims priority under 35 USC 371 to International Application No. PCT/KR2013/009632, filed on Oct. 28, 2013, which claims priority to Korean Patent Application No. 10-2012-0125554, which was filed on Nov. 7, 2012, and Korean Patent Application No. 10-2013-0012666, which was filed on Feb. 5, 2013, each of which is hereby incorporated by reference in its entirety.

TECHNICAL FIELD

The present invention relates to a quantum dot-polymer-layered ceramic composite and a method of manufacturing the same and, more particularly, to a novel quantum dot composite having high stability, where the surface of quantum dots is protected by a polymer and a layered ceramic, and to a method of manufacturing the same.

BACKGROUND ART

A currently widely available white LED is a device configured such that a blue emission LED is coated with a yellow phosphor using a down conversion process that employs a color conversion layer for a blue light source. In this regard, Nichia Corp., Japan, developed such a white LED by coating a blue LED made of gallium nitride (GaN) with a $Y_3Al_5O_{12}:Ce^{3+}$ (YAG:Ce) phosphor. However, the color thereof is difficult to control, and thus white light close to natural light fails to result, and color conversion depending upon changes in the ambient temperature is undesirably caused.

To overcome such problems, research and development into next-generation emission devices using LEDs and quantum dots is ongoing (S. Jeong et al., *J. Phys. Chem. C* 2010, 114, 14362; W. Zou et al., *J. Mater. Chem.* 2011, 21, 13276).

Quantum dots are semiconductor particles having as small a size as ones of nm, and have inherent light receiving/emitting properties. They have therefore been applied to medical imaging devices, solar cells, and emission devices. However, such quantum dots are problematic because the activity thereof is easily deteriorated due to contact with air, oxygen, or water. Hence, when quantum dots are used for emission devices, it is difficult to ensure emission stability.

Also, in order to confer the characteristic advantage of high crystallinity, quantum dots are synthesized in an organic solvent, but may be transferred to an aqueous solution depending on the application fields thereof. In this procedure, fluorescence yield may decrease.

Furthermore, in various application fields thereof, quantum dots are required to be in a solid phase, instead of a colloidal phase. When not in a colloidal phase, quantum dots may aggregate, which may have a negative influence on application thereof.

DISCLOSURE

Technical Problem

Accordingly, an object of the present invention is to provide a novel composite including quantum dots, which may stably protect quantum dots.

Another object of the present invention is to provide a method of manufacturing a novel quantum dot composite, which may stably keep quantum dots and may exhibit superior fluorescence properties in the same concentration.

A further object of the present invention is to provide a high-efficiency optical conversion system using the quantum dot composite having high surface stability.

Technical Solution

In order to accomplish the above objects, the present invention provides a layered ceramic composite configured such that a layered ceramic includes a polymer-quantum dot composite between the layers thereof.

As used herein, the term 'polymer-quantum dot composite' means that quantum dots and a polymer are mixed, and preferably refers to a composite configured such that the surface of quantum dots is surrounded by a polymer so as to protect surface properties of quantum dots by the polymer.

In the present invention, the polymer-quantum dot composite is preferably anionic so as to be intercalated between the layers of the layered ceramic through electrical connection with positively charged layers of the layered ceramic. In an embodiment of the present invention, the anion of the polymer-quantum dot composite may be formed by an anionic polymer linked to the quantum dots. The anionic polymer may include an anionic group comprising carboxylate, sulfate, sulfonate, nitrate, phosphate, and phosphonate at the terminal or middle portion of the polymer chain.

In an embodiment of the present invention, the anionic polymer is preferably an anionic polymer having a hydrophobic portion so as to be attached to hydrophobic organic molecules formed on the surface of quantum dots. In an embodiment of the present invention, the hydrophobic portion of the anionic polymer may include $-CH_2(CH_2)_nCH_3$, (n=5-30).

In a preferred embodiment of the present invention, the anionic polymer may include poly(maleic acid-alt-1-octadecene), poly(lactic-co-glycolic acid), poly(lactic acid), or poly(4-vinylbenzoic acid).

In the present invention, the quantum dots are primarily protected by the anionic polymer, and may be further protected by a layered double hydroxide, and thus the use of typically commercially available quantum dots is possible. In an embodiment of the present invention, the quantum dots may be selected from among semiconductor nanoparticles, including CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge, MgS, MgSe, and MgTe. Also useful are carbon nanoparticles.

In the present invention, the layered ceramic, which is a composite matrix, includes a quantum dot-polymer composite between the layers thereof. Any layered ceramic may be used so long as it includes a quantum dot-polymer composite between the layers thereof.

Figure 1:
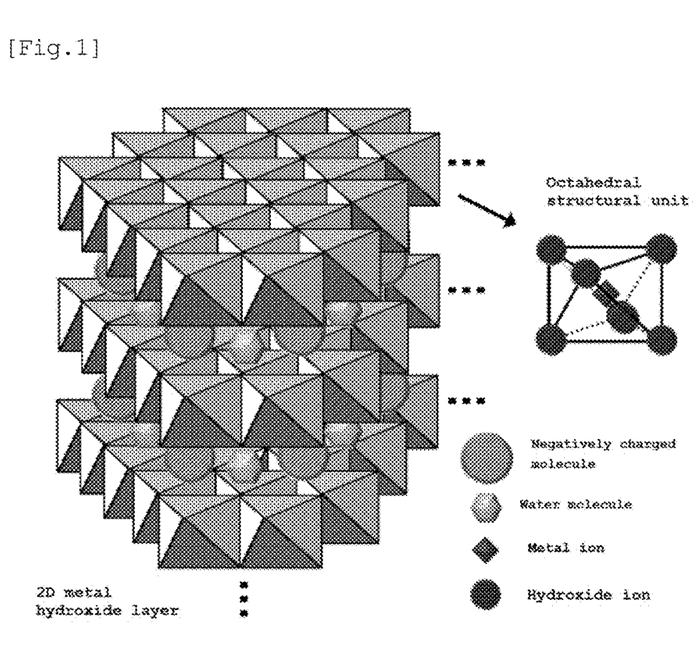
FIG. 1 schematically illustrates a layered ceramic (layered double hydroxide) comprising positively charged 2D metal hydroxide layers and negatively charged molecules.
Figure 2:
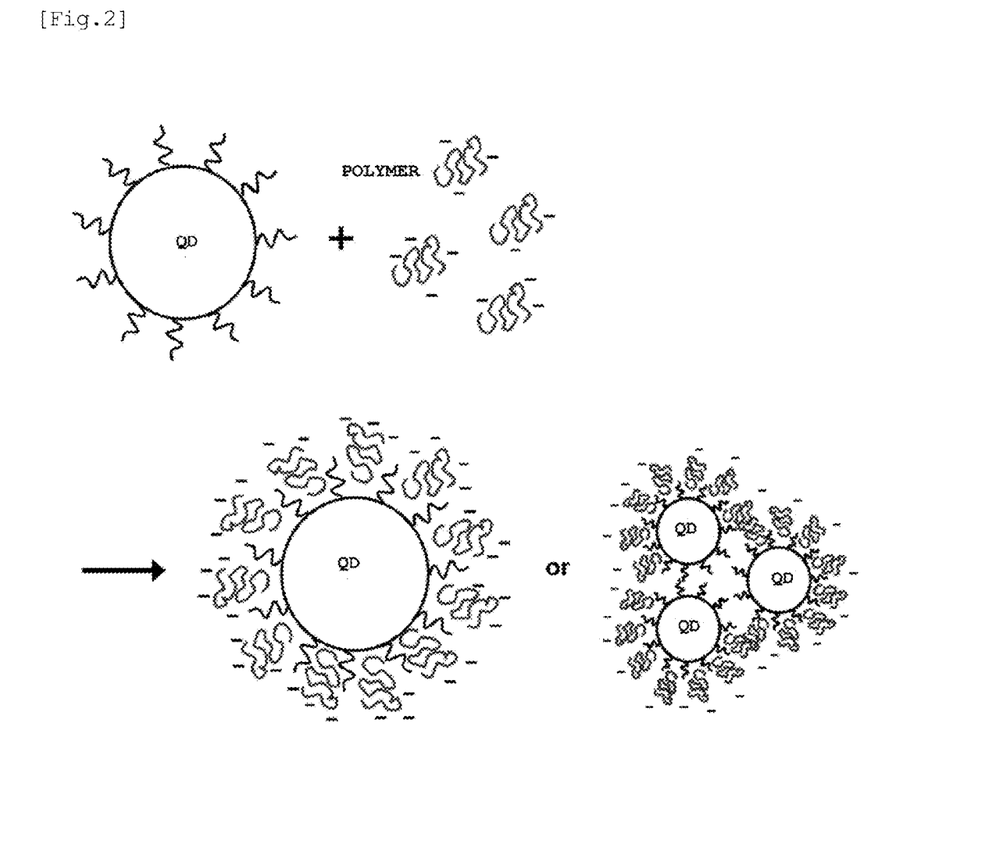
FIG. 2 schematically illustrates formation of a quantum dot-polymer structure.
Figure 3:
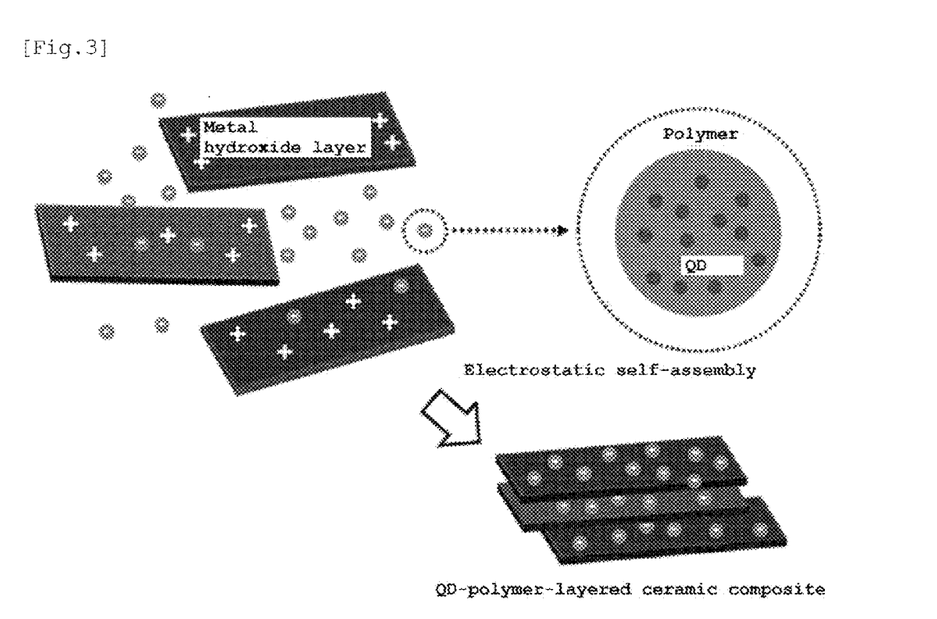
FIG. 3 schematically illustrates formation of a quantum dot-polymer-layered ceramic composite through electrostatic self-assembly.

In the present invention, the layered ceramic may be typically exemplified by a layered double hydroxide. The layered double hydroxide is a structure comprising two-dimensional (2D) metal hydroxide layers as illustrated in FIG. 1. The 2D metal hydroxide layers are composed of octahedral structural units having divalent or trivalent metal ions and hydroxide ions. Examples of the divalent metal ions may include zinc, magnesium, cobalt, nickel, and iron ions, and examples of the trivalent metal ions may include aluminum, chromium, and gallium ions, which are disclosed in References mentioned in the present invention, for example, F. Cavani, F. Trifir, A. Vaccari, *Catal. Today* 1991, 11, 173., P. Beaudot, M. E. D. Roy, J. P. Besse, *Chem. Mater.* 2004, 16, 935.

The 2D metal hydroxide layers are totally positively charged due to the presence of trivalent metal ions arbitrarily distributed therein. Generally, a layered double hydroxide is synthesized in an aqueous solution, and is configured such that, as illustrated in FIG. 1, positively charged sheets and anions are alternately stacked by electrostatic attraction with negatively charged molecules in the aqueous solution.

In the present invention, the polymer-quantum dot composite is anionic so as to be linkable to the cation of the layered double hydroxide by electrostatic attraction. Preferably, such anions are formed by the polymer that constitutes the composite with quantum dots.

In an embodiment of the present invention, the layered double hydroxide may be represented by Formula (1) below.

$$[M_m^{2+}M_n^{3+}(OH)_{2m+2n}]X_{n/z}^{z-} \cdot bH_2O \tag{1}$$

In this formula, $M^{2+}$ is a divalent metal ion, for example, $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$; $M^{3+}$ is a trivalent metal ion, for example, $Al^{3+}$, $Cr^{3+}$, $Fe^{3+}$, $Co^{3+}$, $Mn^{3+}$, $Ni^{3+}$, $Ce^{3+}$, and $Ga^{3+}$; m and n are set so that m/n is 1~10; b is 0~10; and X may be an appropriate anion known to those skilled in the art, and examples thereof may include hydroxide, carbonate, bicarbonate, nitrate, chloride, bromide, sulfonate, sulfate, bisulfate, vanadate, tungstate, borate, phosphate, and Keggin-ions.

In an embodiment of the present invention, the weight ratio of polymer and quantum dots of the polymer-quantum dot composite is preferably set to about 1/1~100/1, and the polymer may have a weight average molecular weight of 5,000~100,000. Also, in an embodiment of the present invention, the weight ratio of the polymer-quantum dot composite and the layered ceramic may approximate to 1/10~1/1000.

In addition, the present invention provides a method of manufacturing a layered ceramic composite, comprising reacting an anionic polymer-quantum dot composite with a cationic exfoliated layered double hydroxide so that the layered double hydroxide includes the polymer-quantum dot composite between the layers thereof.

In the present invention, the anionic polymer-quantum dot composite is dispersed in water and thus reacts with cationic layers of the layered ceramic, thereby forming a layered ceramic composite configured such that the layered ceramic includes the polymer-quantum dot composite between the layers thereof.

In the present invention, the anionic polymer-quantum dot composite dispersed in water may be prepared by mixing quantum dots dispersed in an organic solvent with the anionic polymer and water and then evaporating the organic solvent. Although not theoretically limited, quantum dots synthesized in an organic solvent contain organic molecules on the surface thereof, and when mixed with a negatively charged amphiphilic polymer, the organic molecules of the surface of the quantum dots are attached to the hydrophobic portion of the polymer through hydrophobic interaction, thus forming a quantum dot-polymer structure. Such a quantum dot-polymer structure is electrically charged by the functional group of the polymer, and is thus dispersed in the aqueous solution.

In the present invention, the cationic layers of the layered ceramic may be obtained by exfoliating the layered ceramic, for example, a layered double hydroxide. This exfoliation may be implemented by substitution of the anion of the layered double hydroxide and then reaction with formamide.

In a preferred embodiment of the present invention, the quantum dot-polymer-layered ceramic composite is synthesized using quantum dots comprising CdSe/CdS/ZnS (core/shell/shell) and a negatively charged polymer comprising a hydrolysate of poly(maleic anhydride-alt-1-octadecene) (mw 30,000~50,000). The layered ceramic is a layered double hydroxide containing a zinc ion (divalent ion) and an aluminum ion (trivalent ion).

In addition, the present invention provides the use of a layered ceramic composite to an illuminator, a display, an optical coating material, an anionic exchange material, a catalyst support, an electronic material, a UV absorbent, or a photocatalyst, wherein the layered ceramic composite is configured such that the layered ceramic includes the polymer-quantum dot composite between the layers thereof.

Advantageous Effects

According to the present invention, a composite is configured such that quantum dots are surrounded by a polymer and doubly protected by a layered ceramic, thus decreasing penetration of an exterior material such as gas or water, thereby protecting quantum dots from the exterior environment. Therefore, the composite can be improved in chemical and thermal stability and optical stability. Further, spatial confinement of quantum dots in the composite can increase, thus preventing phase separation or aggregation.

The layered ceramic has structural advantages of a composite matrix, and can possess various properties depending on the components thereof. Also, it has low manufacturing cost and is eco-friendly. The composite can be manufactured without limitation of components or size of the quantum dots contained within the layered ceramic.

The manufacturing method according to the present invention is advantageous in terms of controlling the characteristics of the composite having trapped quantum dots because the composite is manufactured using quantum dots synthesized after adjustment of properties including the size, etc.

Such a quantum dot-polymer-layered ceramic composite can be favorably applied to illuminators, displays, and optical coating materials, and can also be utilized in anionic exchange materials, catalyst supports, electronic materials, UV absorbents, and photocatalysts. Thus, the layered ceramic that constitutes the composite with the quantum dot-polymer structure can be further imparted with characteristics due to the presence of quantum dots and the interaction of quantum dot-matrix, and diverse applications thereof can be expected.

BEST MODE

Hereinafter, a detailed description will be given of the present invention through the following examples, which are merely illustrate but are not construed as limiting the scope of the present invention. Also, it is noted that the scope of the present invention be defined by the claims by those skilled in the art.

EXAMPLE 1

Figure 4:
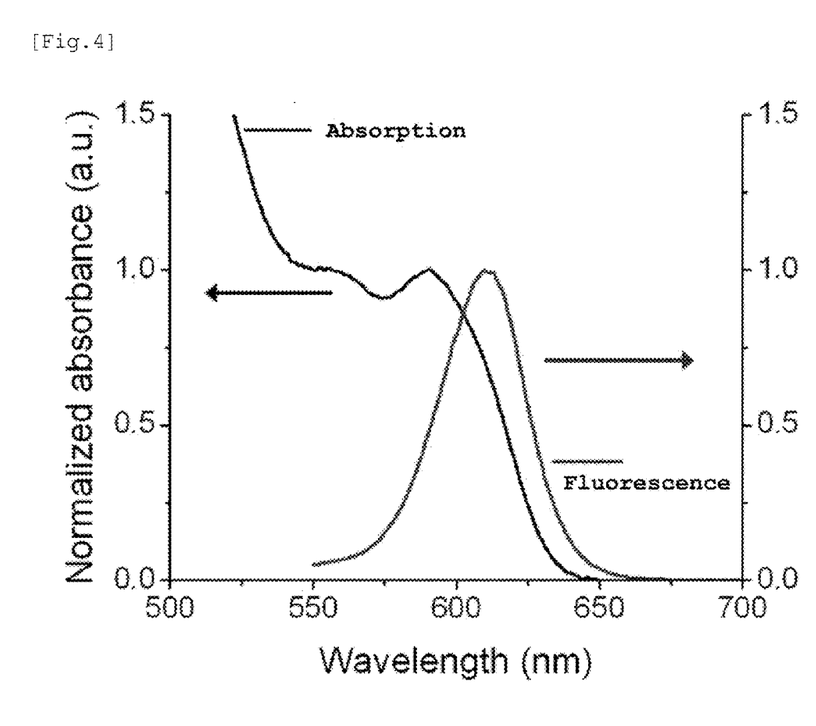
FIG. 4 illustrates absorption and fluorescence spectra of CdSe/CdS/ZnS nanoparticles.

Synthesis of Quantum Dots, Introduction of Surface Thereof with Polymer, and Transfer Thereof to Aqueous Solution CdSe/CdS/ZnS was prepared as follows. Octadecene and oleylamine were placed in a round-bottom flask and heated to 100° C. While a vacuum state and a nitrogen injection state were alternately changed, the ambient atmosphere was consequently fully filled with nitrogen gas. Thereafter, the temperature of the round-bottom flask was increased to 300° C., and solutions of cadmium (Cd) in octadecene and selenium (Se) in octadecene were simultaneously placed in the high-temperature flask at a ratio of Cd to Se of 1:5. As such, the ratio of Cd to Se may be adjusted depending on the desired nanoparticle size. The flask reactor was slowly cooled, thus obtaining CdSe nanoparticles dispersed in the organic solvent. The obtained CdSe nanoparticles were dispersed in the flask containing octadecene and oleylamine, and heated to 100° C. While a vacuum state and a nitrogen injection state were alternately changed, the ambient atmosphere was consequently fully filled with nitrogen gas. Then, the temperature of the flask was increased to 240° C., and reaction was carried out for 10 min each while alternately adding solutions of Cd-oleate in octadecene and sulfur (S) in octadecene. These procedures were repeated three times. Also, reaction using solutions of Zn-oleate in octadecene and S in octadecene was repeated three times in the same manner as above. The reaction temperature was further maintained for about 1 hr, and the flask reactor was slowly cooled to room temperature, giving CdSe/CdS/ZnS nanoparticles dispersed in the organic solvent. The CdSe/CdS/ZnS nanoparticles have absorption and fluorescence properties as illustrated in FIG. 4.

Figure 5:
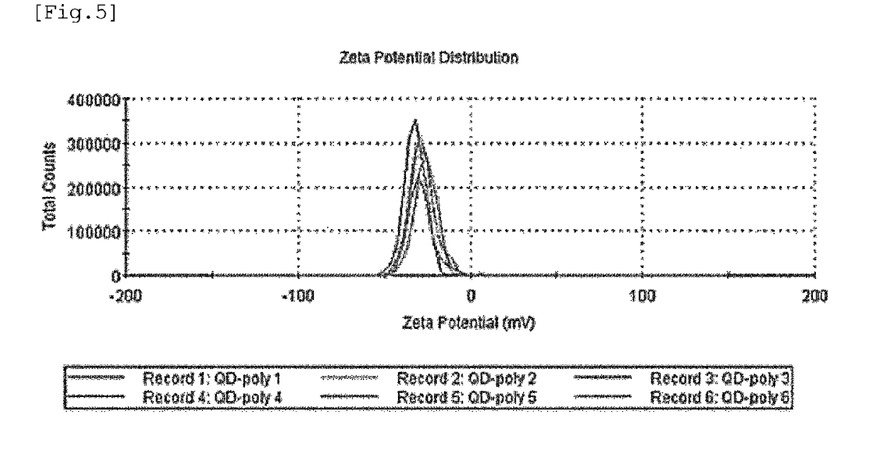
FIG. 5 is a graph illustrating zeta potential distribution of the synthesized quantum dot-polymer structure.
Figure 6:
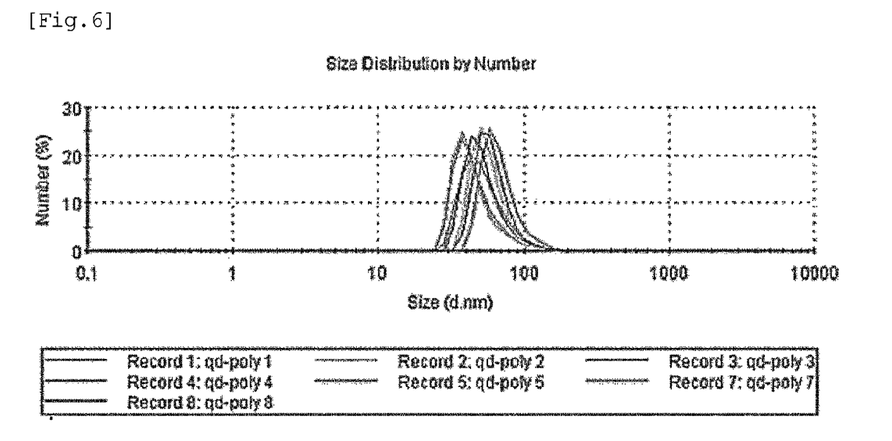
FIG. 6 is a graph illustrating hydrodynamic diameter distribution of the synthesized quantum dot-polymer structure.

In 2 mL of distilled water, 100 nmol poly(maleic anhydride-alt-1-octadecene), and 1 nmol quantum dots dispersed in the organic solvent were placed and then sonicated for 20 min. While the mixture was stirred, it was heated to 80° C. and the organic solvent was selectively evaporated, thus obtaining a quantum dot-polymer structure dispersed in the aqueous solution. The absorption zeta potential is used for analysis of the kind of surface charge of colloidal particles and the size thereof. The zeta potential of the quantum dot-polymer structure is −29.4±3.17 mV (FIG. 5), and the hydrodynamic diameter thereof approximates to 54.5±10.5 nm (FIG. 6).

EXAMPLE 2

Synthesis and Exfoliation of Layered Ceramic (e.g. Layered Double Hydroxide)

Figure 7:
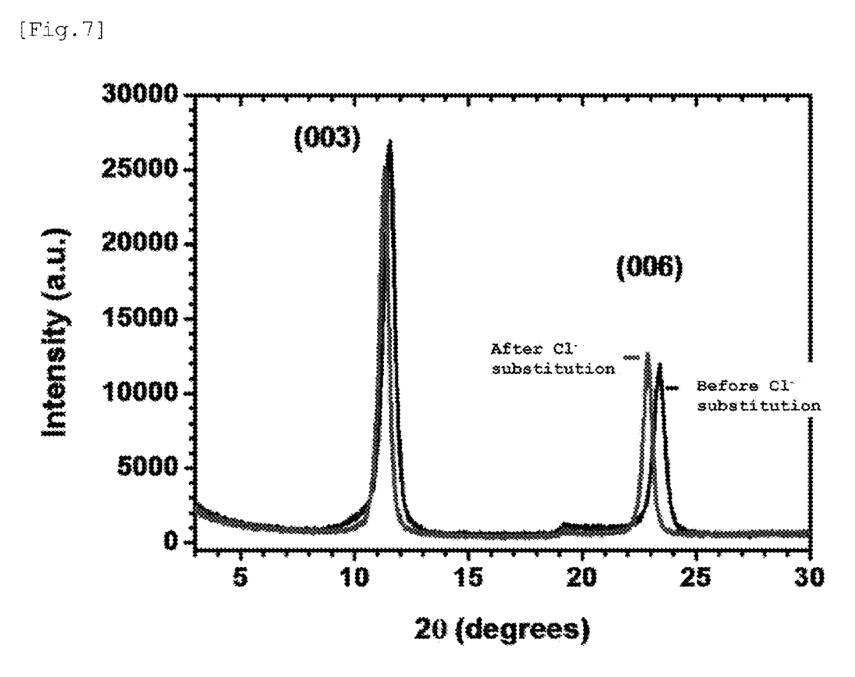
FIG. 7 is a graph illustrating X-ray diffraction analysis before and after Cl⁻ substitution.

At room temperature, 0.01 M zinc nitrate and 0.003 M aluminum nitrate aqueous solutions were added with 0.35 M ammonia with stirring. While the resulting mixture was stirred for 24 hr, the reaction temperature was maintained at room temperature. After completion of the reaction, the layered double hydroxide composite was precipitated using a centrifuge, and the supernatant was then discarded, followed by drying in air. 0.2 g of a layered double hydroxide powder containing $CO_3^{2-}$ as a negatively charged material was added to a 1 M NaCl-HCl solution, and then stirred for 12 hr in a nitrogen atmosphere. The layered double hydroxide composite was precipitated using a centrifuge, and the supernatant was then discarded, followed by drying in air. Through the NaCl-HCl reaction, $CO_3^{2-}$ was substituted with Cl⁻. As is apparent from the results of X-ray diffraction analysis of FIGS. 7, (003) and (006) peaks of the layered double hydroxide are shifted toward a small angle compared to before substitution, from which $CO_3^{2-}$ can be confirmed to be substituted with Cr.

The layered double hydroxide where the negatively charged molecules between the sheets had been substituted with Cl− was placed in a formamide solution in a nitrogen atmosphere, and stirred for 48 hr, thereby exfoliating the layered double hydroxide.

Figure 8:
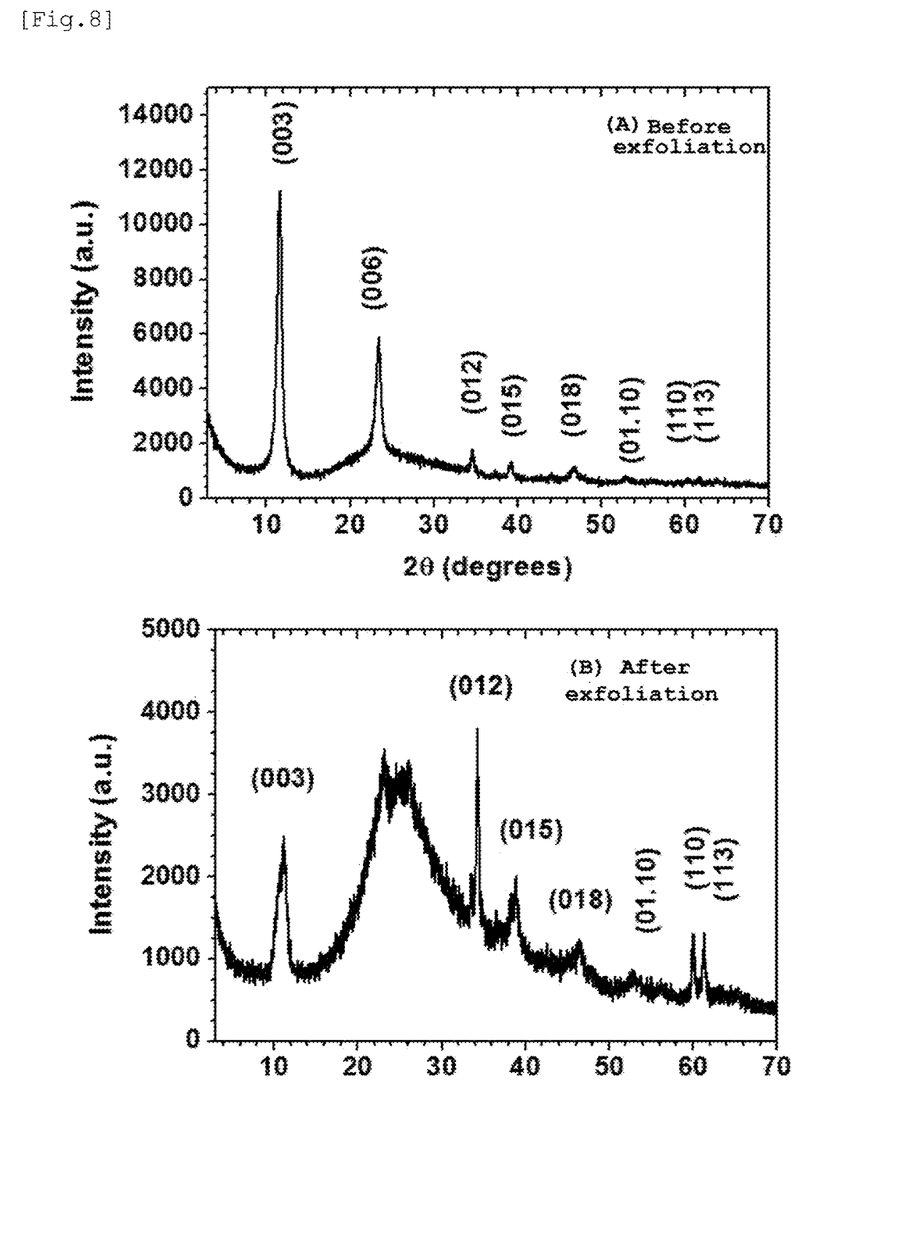
FIG. 8 is a graph illustrating X-ray diffraction analysis of the layered double hydroxide before exfoliation (a) and after exfoliation (b)

As illustrated in FIG. 8, the size of (003) peak that shows the 2D metal hydroxide layer stack is relatively small compared to before the reaction, from which exfoliation can be confirmed to occur.

EXAMPLE 3

Synthesis of Quantum Dot-Polymer-Layered Ceramic Composite

Figure 9:
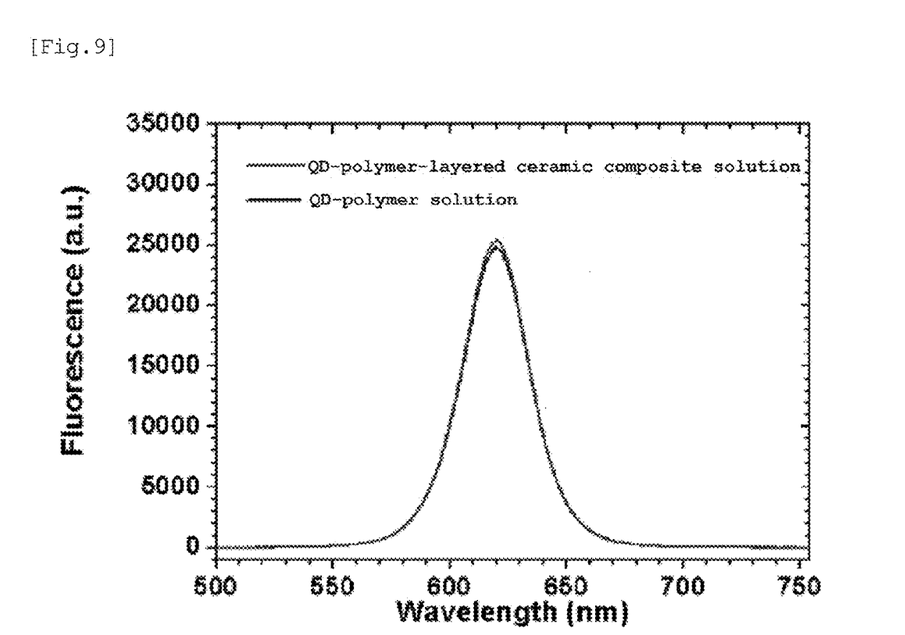
FIG. 9 illustrates fluorescence spectra of a quantum dot-polymer solution and a quantum dot-polymer-layered ceramic composite solution.

The formamide solution containing the exfoliated layered double hydroxide was separated into the formamide supernatant and the layered double hydroxide precipitate using a centrifuge. The supernatant was discarded, and the precipitate was added with an aqueous solution containing the quantum dot-polymer structure and then stirred at room temperature for 1 hr. As illustrated in FIG. 9, the composite having fluorescence is formed and the intensity of fluorescence is equal to or greater than the intensity before formation of the composite, and the position or shape of the peak can be seen to be maintained.

Figure 10:
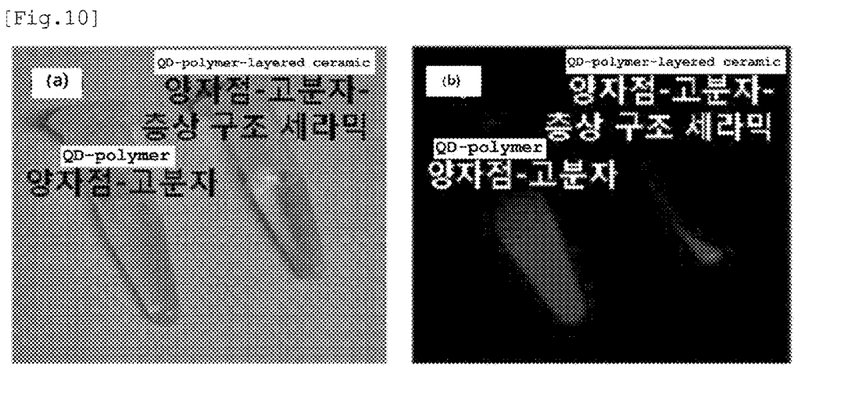
FIG. 10 illustrates (a) images and (b) fluorescence images upon UV irradiation of the quantum dot-polymer solution and the quantum dot-polymer-layered ceramic composite solution after centrifugation.

Upon centrifugation at 2000 rpm for 3 min using a centrifuge, as illustrated in FIG. 10, while the composite is formed, the quantum dot-polymer structure is trapped in the layered ceramic and thus precipitated. The quantum dot-polymer structure centrifuged under the same conditions is well dispersed in the aqueous solution, with no precipitate.

EXAMPLE 4

Formation of Film Via Drop Casting and Fluorescence Properties

Figure 11:
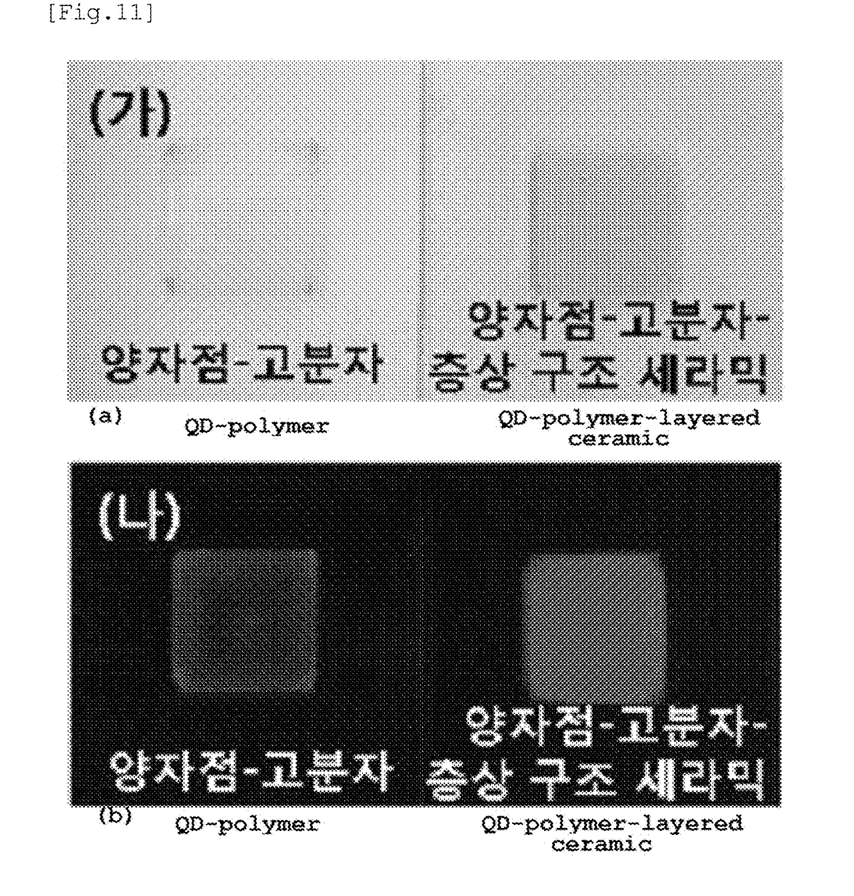
FIG. 11 illustrates (a) images and (b) fluorescence images upon UV irradiation of a quantum dot-polymer film and a quantum dot-polymer-layered ceramic composite film.
Figure 12:
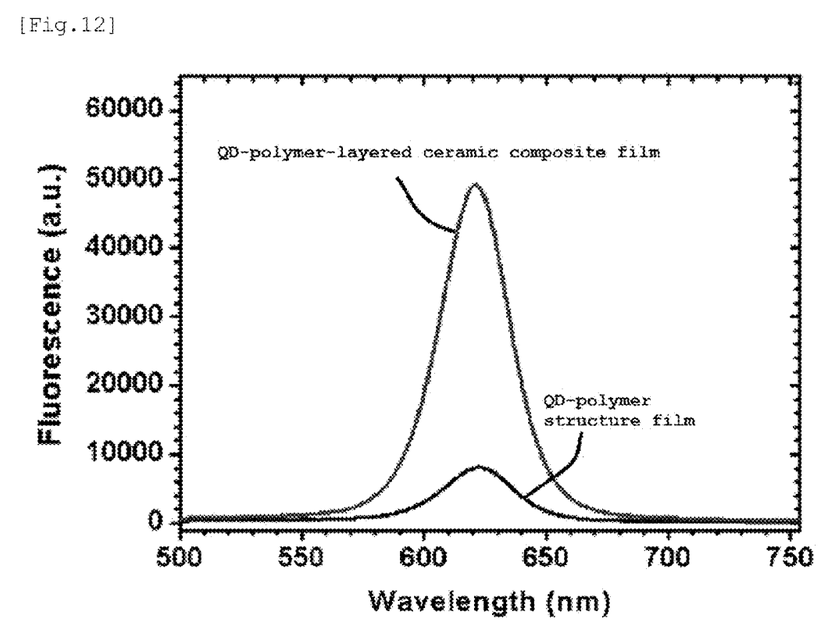
FIG. 12 illustrates fluorescence spectra of the quantum dot-polymer film and the quantum dot-polymer-layered ceramic composite film.

The quantum dot-polymer-layered ceramic composite solution was dropped on a glass substrate and the solvent was evaporated at room temperature, thus forming a composite film. As illustrated in FIG. 11, the quantum dot-polymer-layered ceramic composite film is relatively uniform compared to the quantum dot-polymer structure film under the condition that the quantum dots have the same concentration. Although such a composite film contains the quantum dots in the same concentration, it exhibits relatively strong fluorescence properties (FIG. 12).

The invention claimed is:

1. A layered ceramic composite, configured such that a layered ceramic includes a polymer-quantum dot composite between layers thereof, wherein the polymer-quantum dot composite is a composite that comprises anionic polymers having a hydrophobic portion attach to organic molecules on the surface of the quantum dot.

2. The layered ceramic composite of claim 1, wherein the anionic polymer includes at least one anionic group selected from the group consisting of carboxylate, sulfate, sulfonate, nitrate, phosphate, and phosphonate.

3. The layered ceramic composite of claim 1, wherein the polymer is poly(maleic anhydride-alt-1-octadecene).

4. The layered ceramic composite of claim 1, wherein the layered ceramic is a layered double hydroxide.

5. The layered ceramic composite of claim 4, wherein the layered double hydroxide is represented by Formula (1) below:

$$[M_m^{2+}M_n^{3+}(OH)_{2m+2n}]X_{n/z}^{z-} \cdot bH_2O \qquad (1)$$

wherein $M^{2+}$ is $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, or $Mg^{2+}$; $M^{3+}$ is $Al^{3+}$, $Cr^{3+}$, $Fe^{3+}$, $Co^{3+}$, $Mn^{3+}$, $Ni^{3+}$, $Ce^{3+}$, or $Ga^{3+}$; m and n are set so that m/n is 1~10; b is 0~10; and X is an anion selected from the group consisting of hydroxide, carbonate, bicarbonate, nitrate, chloride, bromide, sulfonate, sulfate, bisulfate, vanadate, tungstate, borate, phosphate, and Keggin-ions.

6. The layered ceramic composite of claim 1, wherein the quantum dot is a nanoparticle comprising at least one semiconductor material selected from the group consisting of CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge, MgS, MgSe, and MgTe.

7. An illuminator, a display, an optical coating material, an anionic exchange material, a catalyst support, an electronic material, a UV absorbent, or a photocatalyst, comprising the layered ceramic composite of claim 1.

8. A method of manufacturing a layered ceramic composite, comprising reacting an anionic polymer-quantum dot composite with a cationic exfoliated layered double hydroxide, wherein the polymer-quantum dot composite is a composite that comprises anionic polymers having a hydrophobic portion attach to organic molecules on the surface of the quantum dot.

9. The method of claim 8, wherein the anionic polymer-quantum dot composite is configured such that a surface of quantum dots is surrounded by an anionic polymer.

10. The method of claim 8, wherein the exfoliated layered double hydroxide is mixed and reacted with an aqueous solution of the anionic polymer-quantum dot composite.

11. The method of claim 8, wherein the anionic polymer-quantum dot composite is obtained by mixing quantum dots dispersed in an organic solvent with an anionic polymer aqueous solution and then removing the organic solvent.

12. The method of claim 11, wherein the anionic polymer is an amphiphilic polymer comprising an anionic group reacting with the cationic exfoliated layered double hydroxide and a hydrophobic group linked to the quantum dots.

13. The method of claim 8, wherein the anionic polymer includes at least one anion selected from the group consisting of carboxylate, sulfate, sulfonate, nitrate, phosphate, and phosphonate.

14. The method of claim 8, wherein the anionic polymer is prepared by hydrolyzing poly(maleic anhydride-alt-1-octadecene).

15. The method of claim 8, wherein the exfoliated layered double hydroxide is obtained by substituting an interlayer ion of a layered double hydroxide.

\* \* \* \* \*